W. D. BROOKS.
Horse Hay Fork.
No. 82,485. Patented Sept. 29, 1868.
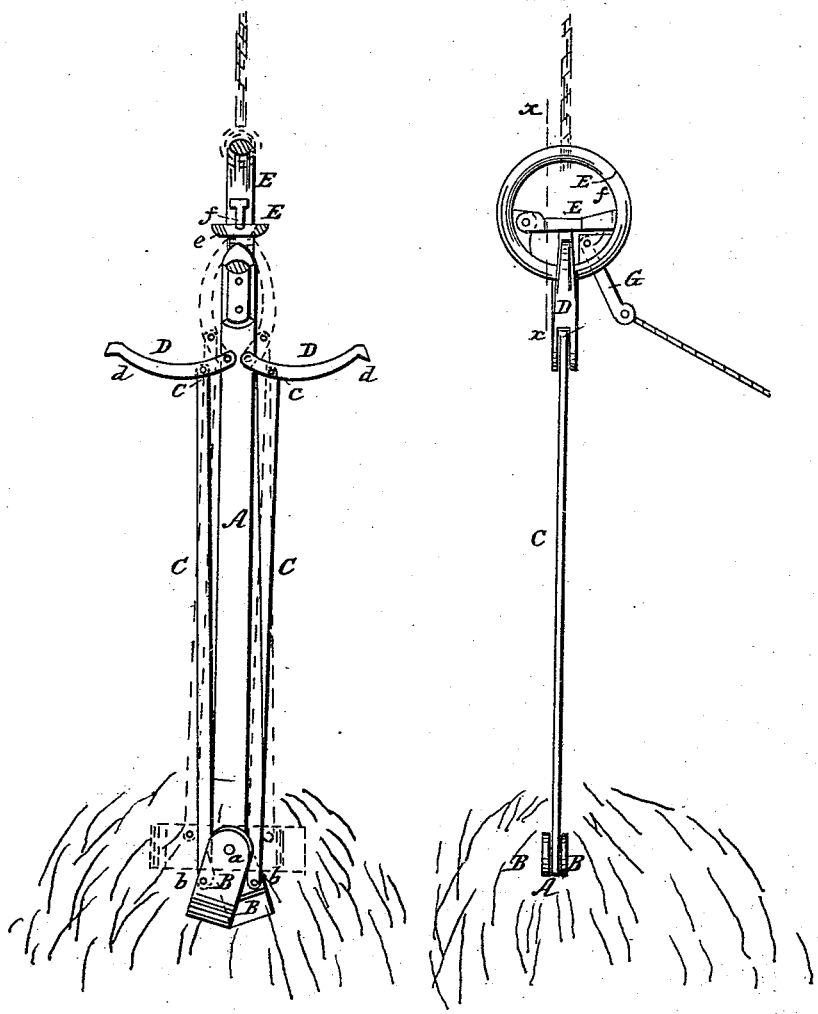

UNITED STATES PATENT OFFICE.

WILLIAM D. BROOKS, OF BETHANY, PENNSYLVANIA.

IMPROVEMENT IN HORSE HAY-FORKS.

Specification forming part of Letters Patent No. 82,485, dated September 29, 1868.

*To all whom it may concern:*

Be it known that I, WILLIAM D. BROOKS, of Bethany, in the county of Wayne and State of Pennsylvania, have invented a new and Improved Horse Hay-Fork; and I do hereby declare that the following is a full, clear, and exact description thereof, which will enable others skilled in the art to make and use the same, reference being had to the accompanying drawings, forming part of this specification.

This invention relates to a new and improved device for elevating hay and grain, both for stacking and moving the same in barns, which devices are commonly termed "horse hay-forks."

The present invention consists in a peculiar construction of a device for such purpose, whereby hay or grain, in whatever position it may be, so long as it may be stacked and moved away with safety, can be elevated with the greatest facility.

In the accompanying sheet of drawings, Figure 1 is a side sectional view of my invention, taken in the line $x x$, Fig. 2; Fig. 2, an edge view of the same.

Similar letters of reference indicate corresponding parts.

A represents a flat bar of spring-steel, of any suitable length, and having two cast-steel cutters, B B, attached to its lower end by one and the same pivot-bolt, $a$, the cutters being attached to opposite sides of the bar. These cutters may be described as resembling chisels, or the cutters used in joiners' planes cut much larger. The shape of the cutters is shown clearly in Fig. 1. Each cutter has one end of a bar, C, connected to it by a pivot-bolt, $b$, and the upper ends of the bars C are connected by pivot-bolts $c$ to curved arms D D, the inner ends of the latter being pivoted to the bar A. The outer ends of the arms D D are formed with hooks $d$, (shown clearly in Fig. 1,) and when the arms D are raised or moved upward a slotted rod, E, receives the hooks and holds the upper ends of the arms in contact, and also holds the cutters B B outward, at right angles with the bar A, at opposite sides thereof, as shown in red in Fig. 1. The rod E is pivoted at one end in a ring, F, which is attached to the upper end of the bar A, and the rod at each side through slot $e$ in said rod, which receives the upper ends or hooks of the arms D D, is beveled, so that the arms D D, when raised, will lift the rod to admit of the latter dropping, so that the slot $e$ may receive the hooks, as shown in red in Fig. 1. The free or disengaged end of the rod E, is notched or slotted, and works on a rib, $f$, in the inner side of ring F, which rib serves as a guide for the rod, (see Fig. 2,) and within a slot in the ring there is fitted a lever, G, to which a trip-rope is attached, said lever being under the free or disengaged end of the rod E. When the arms D D are freed from the rod E, the cutters B B will be down or have a pendent position, as shown in black in Fig. 1, and when in this position are forced down into the hay or grain, cutting their way into the same. After being thrust or forced down into the hay or grain, the operator shoves upward the arms D D, which are caught by the rod E, and hold the cutters D D outward in a horizontal position, as shown in red in Fig. 1. The device is then elevated by the usual tackle, having a horse attached, the hoisting-rope being attached to the ring F, and the device ascends with its load, the latter being sustained by the horizontal position of the cutters; and when the load has been elevated and brought over the desired spot, the operator pulls the trip-rope and thereby raises the rod E and frees the arms D D, and the load on the cutters B B will be discharged by its own gravity.

This device, it will be seen, may be used in all cases where any ordinary horse hay-fork may be employed. It may be elevated over or above beams, through windows, and over obstructions which render most of the hay-forks in use impracticable.

Having thus described my invention, what I claim as new, and desire to secure by Letters Patent, is—

The beveled lever E, pivoted in the ring F, and slotted at $e$ to engage with the projections $d$ upon the levers D, its forward end slotted to work upon the rib $f$ in the inner side of the ring F, said lever E adapted to be raised to receive the levers D by means of the angular lever G, also pivoted in the ring F, as herein described, for the purpose specified.

WM. D. BROOKS.

Witnesses:
 ALEX. F. ROBERTS,
 J. M. COVINGTON.